Patented Sept. 4, 1951

2,566,926

UNITED STATES PATENT OFFICE 2,566,926

ONE-PHASE ANTIRUST LIQUID CONTAINING TRIETHANOLAMINE METABORATE, TRIETHANOLAMINE, AND A LONG-CHAIN ALCOHOL

Lloyd M. Burghart, Darien, Conn., assignor, by mesne assignments, to National Distillers Products Corporation, New York, N. Y., a corporation of Virginia No Drawing. Application November 13, 1947, Serial No. 785,829

12 Claims. (Cl. 252—75)

This invention relates to one-phase, liquid antirust concentrates, and more particularly to such concentrates which are suitable for packaging in small units sized for convenient treatment of individual pieces of equipment, such as automobile radiators, etc.

It has become quite generally recognized that protection of an automobile radiator against corrosion during summer driving is just as important as the use of a properly inhibited antifreeze solution (e. g., ethylene glycol) in winter driving. Generally speaking, any inhibitor or combination of inhibitors contained in an antifreeze may be expected to yield as good corrosion protection if supplied to the water used in a radiator during the summer season. That this is true may be inferred from the fact that most antifreeze producers have at one time or another attempted to market some form of concentrate of the antirust ingredient or ingredients which they add to their antifreeze solutions.

If the corrosion inhibitor is a single chemical compound, whether liquid or solid, the preparation of suitable unit packages is a simple and obvious matter. If the inhibitor is a composition and the individual components are solid, the preparation of a unit package is practically as easy as for the preceding. If a liquid antirust composed of mixed inhibitors is to be prepared and the individual components are known to be soluble in a specified common solvent, there is still little difficulty in marketing the antirust as a one-phase product. If, however, the inhibitor components are unlike in type (for instance, some of them being organic and oily in type and others inorganic and of a water-soluble type) and are not known to be soluble in any common solvent, a field for extensive experiment opens up when one attempts to prepare a highly concentrated one-phase product containing such components.

It is therefore an object of this invention to prepare a one-phase, liquid antirust concentrate containing unlike types of corrosion inhibitors.

It is also an object of this invention to prepare a one-phase, liquid antirust concentrate containing as corrosion inhibitors an alkanolamine metaborate or diacetonealkamine metaborate, an alkali metal nitrite and a long-chain alcohol (film former).

The aforementioned and other objects are accomplished in accordance with this invention by mixing the alkanolamine metaborate or diacetonealkamine metaborate, alkali metal nitrite and long-chain alcohol in a solvent which consists of a mixture of ethylene glycol or propylene glycol and isopropanol, n-butanol or tert.-butanol.

For example, a specific composition falling within the scope of the present invention may be prepared by adding 3.33 gms. of sodium nitrite (added as a 40% aqueous solution), 66.1 gms. of triethanolamine, 22.2 gms. of orthoboric acid and 27.09 gms. of lauryl alcohol to a solvent consisting of 82.76 ml. of propylene glycol and 17.24 ml. of n-butanol at room temperature, and thereafter stirring the mixture until it is homogeneous. The triethanolamine and orthoboric acid react in situ in the composition to form 68.8 gms. of triethanolamine metaborate and 6.4 gms. of water, leaving in excess 13.1 gms. of triethanolamine.

A similar composition may be prepared by adding to a solvent consisting of 90.57 gms. of propylene glycol and 9.43 ml. of n-butanol 3.64 gms. of sodium nitrite, 72.1 gms. of triethanolamine, 24.4 gms. of orthoboric acid, 14.82 gms. of lauryl alcohol, 7.40 gms. of n-decyl alcohol and 7.43 gms. of 2-ethylhexanol. Here again, the triethanolamine and orthoboric acid react in situ in the composition, forming 75.3 gms. of triethanolamine metaborate and 7.0 gms. of water and leaving in excess 14.3 gms. of triethanolamine Various modifications may be made in the aforementioned specific compositions to provide additional one-phase, liquid antirust concentrates which fall within the scope of the present invention. Thus, the relative proportions of the glycol and the alcohol may be varied so that the organic solvent portion of the concentrate contains from about 65 to about 95% by volume of ethylene glycol or propylene glycol (or mixtures thereof) and from about 5 to about 35% by volume of i-propanol, n-butanol or tert.-butanol (or mixtures thereof). In addition, the aqueous sodium nitrite employed in the preparation of the specific compositions may be replaced by anhydrous sodium nitrite, and sodium nitrite may be replaced by an equal weight of other alkali metal nitrites, such as lithium nitrite or potassium nitrite. In general, the composition should contain from about 0.005 to about 0.05 gm. of alkali metal nitrite per ml. of glycol-alcohol solvent.

In the specific examples, the triethanolamine metaborate was formed in situ in the composition, since that is the most convenient method of incorporating that compound into the fluid antirust concentrate. Alternatively, however, the triethanolamine metaborate may be produced externally of the composition, and thereafter added as such thereto. Furtermore, in place of the metaborate of triethanolamine there may be substituted the metaborates of the other ethanolamines (viz., monoethanolamine and diethanolamine) and of the propanolamines (e. g., monoisopropanolamine, dipropanolamine and triisopropanolamine) or diacetonealkamine

$$(CH_3—CH(OH)—CH(NH_2)—CO—CH_3)$$

In general, the composition of the present invention should be as highly concentrated as possible from the standpoint of the metaborate contained therein, and hence it should contain at least about 0.10, and preferably at least about 0.50 gm. of metaborate per ml. of glycol-alcohol solvent. The upper limit of concentration of the metaborate will generally be about 1.00 gm. thereof per ml. of glycol-alcohol solvent. In addition, as the specific examples illustrate, the composition should contain free amounts of the ethanolamines, propanolamines or diacetonealkamine to assist in the solution of the metaborate. For such purpose, from about 0.10 to about 0.30 gm. of the ethanolamines, propanolamines or diacetonealkamine per gm. of metaborate should preferably be employed.

In the specific compositions which have been described, lauryl alcohol, n-decyl alcohol and 2-ethylhexanol were incorporated therein as a film-forming agent which is thrown out of solution when the composition is diluted with large amounts of water. It is not essential, however, that those specific alcohols be the film-forming agent incorporated into the composition, and for those specific alcohols there may be substituted an equal weight of any saturated, aliphatic, monohydric alcohol having from eight to fourteen carbon atoms, such as 2-heptanol, n-tetradecyl alchol, n-octyl alcohol or n-decyl alcohol, or preferably mixtures thereof as in the second specific composition. The amount of film-formers incorporated into the composition may also be varied over a wide range, such range in general being from about 0.15 to about 0.35 gm. of long-chain alcohol per ml. of glycol-alcohol solvent.

The composition of the present invention is essentially a solution of three corrosion inhibitors (alkali metal nitrite, alkanolamine or other metaborate, and long-chain alcohol) dissolved in a mixture of solvents (ethylene glycol or propylene glycol and i-propanol, n-butanol or tert.-butanol). The composition may, however, contain certain amounts of other ingredients which do not detract from its utility or advantageous properties, such as dyes or water, the latter of which may generally be present in an amount up to about 0.50 gm. per ml. of glycol-alcohol solvent.

The composition described herein is a valuable composition of matter in that it is one-phase and hence can be easily dispensed, and also in that about one-half pint thereof will satisfactorily inhibit the corrosion in the average automobile radiator (4 gal. capacity). Furthermore, as will be apparent to those skilled in the art, the composition may be added to heat transfer fluids (e. g., water, monohydric aliphatic alcohols or polyhydric aliphatic alcohols, or mixtures of such alcohols with water) used in a wide variety of other heat transfer apparatus.

I claim:

1. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of an alkali metal nitrite per ml. of glycol-alcohol solvent, from about 0.10 gm. to about 1.0 gm. per ml. of glycol-alcohol solvent of a metaborate of a material selected from the group consisting of the ethanolamines, propanolamines and diacetonealkamine, from about 0.10 to about 0.30 gm. per gm. of said metaborate of an amine selected from said last-mentioned group, and from about 0.15 gm. to about 0.35 gm. of a saturated, aliphatic, monohydric alcohol having from eight to fourteen carbon atoms per ml. of glycol-alcohol solvent.

2. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycol-alcohol solvent, from about 0.10 gm. to about 1.0 gm. per ml. glycol-alcohol solvent of a metaborate of a material selected from the group consisting of ethanolamines, propanolamines and diacetonealkamine, from about 0.10 to about 0.30 gm. per gm. of said metaborate of an amine selected from said last-mentioned group, and from about 0.15 gm. to about 0.35 gm. of a saturated, aliphatic, monohydric alcohol having from eight to fourteen carbon atoms per ml. of glycol-alcohol solvent.

3. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of ethylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycol-alcohol solvent, from about 0.10 gm. to about 1.0 gm. per ml. of glycol-alcohol solvent of a metaborate of a material selected from the group consisting of the ethanolamines, propanolamines and diacetonealkamine, from about 0.10 to about 0.30 gm. per gm. of said metaborate of at least one amine selected from said last-mentioned group, and from about 0.15 gm. to about 0.35 gm. of a saturated, aliphatic, monohydric alcohol having from eight to fourteen carbon atoms per ml. of glycol-alcohol solvent.

4. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of ethylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 1.0 gm. per ml. of glycol-alcohol solvent of a metaborate of a material selected from the group consisting of the ethanolamines, propanolamines and diacetonealkamine, from about 0.10 to about 0.30 gm. per gm. of said metaborate of at least one amine selected from said last-mentioned group, and from about 0.15 gm. to about 0.35 gm. of a saturated, aliphatic, monohydric alcohol having from eight to fourteen carbon atoms per ml. of glycol-alcohol solvent.

5. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of ethylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 1.0 gm. per ml. of glycol-alcohol solvent of triethanolamine metaborate, from about 0.10 to about 0.30 gm. of triethanolamine per gm. of triethanolamine metaborate, and from about 0.15 gm. to about 0.35 gm. of a saturated, aliphatic, monohydric alcohol having from eight to fourteen carbon atoms per ml. of glycol-alcohol solvent.

6. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of ethylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 1.0 gm. per ml. of glycol-alcohol solvent of triethanolamine metaborate, from about 0.10 to about 0.30 gm. of triethanolamine per gm. of triethanolamine metaborate, and from about 0.15 gm. to about 0.35 gm. of lauryl alcohol per ml. of glycol-alcohol solvent.

7. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of propylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycol-alcohol solvent, from about 0.10 gm. to about 1.0 gm. per ml. of glycol-alcohol solvent of a metaborate of a material selected from the group consisting of the ethanolamines, propanolamines and diacetonealkamine, from about 0.10 to about 0.30 gm. per gm. of said metaborate of at least one amine selected from said last-mentioned group, and from about 0.15 gm. to about 0.35 gm. of a saturated, aliphatic, monohydric alcohol having from eight to fourteen carbon atoms per ml. of glycol-alcohol solvent.

8. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of propylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 1.0 gm per ml. of glycol-alcohol solvent of a metaborate of a material selected from the group consisting of the ethanolamines, propanolamines and diacetonealkamine, from about 0.10 to about 0.30 gm. per gm. of said metaborate of at least one amine selected from said last-mentioned group, and from about 0.15 gm. to about 0.35 gm. of a saturated, aliphatic, monohydric alcohol having from eight to fourteen carbon atoms per ml. of glycol-alcohol solvent.

9. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of propylene glycol and from about 5 to about 35% by volume of n-butanol, and, dissolved, therein, from about 0.005 to about 0.05 gm. of sodium nitrite per ml. of glycol-alcohol solvent, from about 0.10 gm. to about 1.0 gm. per ml. of glycol-alcohol solvent of triethanolamine metaborate, from about 0.10 to about 0.30 gm. of triethanolamine per gm. of triethanolamine metaborate, and from about 0.15 gm. to about 0.35 gm. of a saturated, aliphatic, monohydric alcohol having from eight to fourteen carbon atoms per ml. of glycol-alcohol solvent.

10. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of propylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 1.0 gm. per ml. of glycol-alcohol solvent of triethanolamine metaborate, from about 0.10 to about 0.30 gm. of triethanolamine per gm. of triethanolamine metaborate, and from about 0.15 gm. to about 0.35 gm. of lauryl alcohol per ml. of glycol-alcohol solvent.

11. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of an alkali metal nitrite per ml. of glycol-alcohol solvent, from about 0.10 gm. to about 1.0 gm. per ml. of glycol-alcohol solvent of a metaborate of a material selected from the group consisting of the ethanolamines, propanolamines and disacetonealkamine, from about 0.10 to about 0.30 gm. per gm. of said metaborate of an amine selected from said last-mentioned group, and from about 0.15 gm. to about 0.35 gm. of a mixture of saturated, aliphatic, monohydric alcohols having from eight to fourteen carbon atoms per ml. of glycol-alcohol solvent.

12. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of at least one material selected from the group consisting of i-propanol, n-butanol and tert.-butanol, and, dissolved therein, from about 0.005 to about 0.05 gm. of an alkali metal nitrite per ml. of glycol-alcohol solvent, from about 0.10 gm. to about 1.0 gm. per ml. of glycol-alcohol solvent of a metaborate of a material selected from the group consisting of the ethanolamines, propanolamines and diacetonealkamine, from about 0.10 to about 0.30 gm. per gm. of said metaborate of an amine selected from said last-mentioned group, and from 0.15 gm. to about 0.35 gm. of a saturated, aliphatic, monohydric alcohol having from eight to fourteen carbon atoms per ml. of glycol-alcohol solvent.

LLOYD M. BURGHART.

REFERENCES CITED

The following references are of record in the file of this patent:

UNITED STATES PATENTS

| Number | Name | Date |
|---|---|---|
| 1,992,689 | Cox | Feb. 26, 1935 |
| 2,126,173 | Clapsadle et al. | Aug. 9, 1938 |
| 2,147,149 | Clapsadle et al. | Feb. 14, 1939 |
| 2,264,362 | Clapsadle | Dec. 2, 1941 |
| 2,386,182 | Balcar | Oct. 9, 1945 |